(12) United States Patent
Saviharju et al.

(10) Patent No.: US 7,661,376 B2
(45) Date of Patent: Feb. 16, 2010

(54) SYSTEM FOR PRODUCING ENERGY AT A PULP MILL

(75) Inventors: Kari Saviharju, Espoo (FI); Jorma Simonen, Alpharetta, GA (US); Olli Arpalahti, Varkaus (FI); Lasse Koivisto, Varkaus (FI)

(73) Assignee: Andritz Oy, Helsinki (FI)

( * ) Notice: Subject to any disclaimer, the term of this patent is extended or adjusted under 35 U.S.C. 154(b) by 0 days.

(21) Appl. No.: 10/516,954

(22) PCT Filed: Jun. 6, 2003

(86) PCT No.: PCT/FI03/00447

§ 371 (c)(1),
(2), (4) Date: Jun. 27, 2005

(87) PCT Pub. No.: WO03/104547

PCT Pub. Date: Dec. 18, 2003

(65) Prior Publication Data
US 2005/0252458 A1 Nov. 17, 2005

Related U.S. Application Data

(60) Provisional application No. 60/386,434, filed on Jun. 7, 2002.

(51) Int. Cl.
*F23G 7/04* (2006.01)

(52) U.S. Cl. .............. 110/348; 110/238; 110/208; 110/295; 122/7 R

(58) Field of Classification Search .......... 110/343, 110/245, 238, 348; 60/39.182, 653; 122/7 R
See application file for complete search history.

(56) References Cited

U.S. PATENT DOCUMENTS 2,606,103 A * 8/1952 Hamm ............... 422/185
4,676,177 A * 6/1987 Engstrom ............ 110/345
5,454,980 A * 10/1995 Schlueter et al. ........ 252/500
5,509,997 A 4/1996 Kuusio et al.
5,855,736 A 1/1999 Pikkujämsätet et al.

FOREIGN PATENT DOCUMENTS

| EP | 0 614 500 B1 | 1/2007 |
| JP | 60-105802 | 6/1985 |
| WO | WO 92/18690 | 10/1992 |
| WO | WO 03/095738 A1 | 11/2003 |

OTHER PUBLICATIONS

International Search Report dated Sep. 1, 2003.
Johan Nygaard, Sodapanna med extern overhettare (Kraft Recovery Boiler With External Superheater), Mar. 1998, 69 pages total, (English Summary at pp. 5-7).

* cited by examiner

*Primary Examiner*—Kenneth B Rinehart
(74) *Attorney, Agent, or Firm*—Nixon & Vanderhye P.C.

(57) ABSTRACT

A spent liquor recovery boiler system including a boiler having a water/steam circulation system with superheaters and a furnace for recovering energy and chemicals from spent liquor combusted therein, the walls of the boiler are formed of a plurality of water-cooled tubes connected to the water/steam circulation system. The system is provided with at least one cavity having walls formed of water-cooled tubes connected to the water/steam circulation system, means for combusting a fuel and at least one outlet for discharging combustion gases to the boiler, the interior of the at least one cavity being provided with heat exchanger means for final superheating of the steam generated in the boiler, said heat exchanger means being connected to the superheaters of the boiler.

16 Claims, 1 Drawing Sheet

SYSTEM FOR PRODUCING ENERGY AT A PULP MILL

REFERENCES TO RELATED APPLICATIONS

This application is the US national phase of international application PCT/FI03/00447 filed 6 Jun. 2003 which designated the U.S. and claims benefit of U.S. provisional application Ser. No. 60/386,434 filed 7 Jun. 2002, the entire contents of both of which applications are incorporated by reference.

BACKGROUND AND SUMMARY OF THE INVENTION

In chemical pulp mills the cooking chemicals of a pulping process are recovered from black liquor by firing the black liquor in a recovery boiler alone or together with other "waste" streams. The firing process is exothermic and the released energy is recovered as pressurized superheated steam. The steam energy is recovered in a steam turbine in form of electric power and low-pressure steam for process needs.

Traditionally, energy is produced in a pulp mill by combusting black liquor in a recovery boiler, and wood wastes and bark in an auxiliary boiler. The bark of the wood raw material and the organic substance of generated black liquor together normally supply the entire energy demand of the pulp mill. If more energy is needed in the pulp mill, additional fuel may be purchased. The additional fuel is combusted with the wood bark in the auxiliary boiler. Conventionally, energy is produced in a pulp mill in the following way: a recovery boiler and an auxiliary boiler, wherein waste wood bark from the mill is combusted to generate superheated high-pressure steam. The generated steam is forced through a backpressure steam turbine(s) and the released steam is used to provide heat for the mill. The turbine and a generator connected thereto produce electricity needed to power the mill.

Wood contains small amounts of potassium (K) and chlorine (Cl). These elements remain in the black liquor during cooking. In the recovery boiler, these elements are enriched into the fly ash and increase the corrosiveness of the flue gas especially in the superheater. The corrosiveness of Cl and K increase with temperature. The corrosiveness of Cl and K impose an upper temperature limit on the steam generated in the recovery boiler. This limit for the superheated steam temperature is typically 400° to 490° C., depending on the content of chlorine and potassium. With special materials or with liquors having a very low Cl and K content, steam temperatures up to 520° C. have been used. Because the corrosiveness of Cl and K generally require the temperature of the superheated steam to be held relatively low, the steam pressure is also low. These temperature limitations result in low power yield from the heat generated in the recovery boiler, as compared to normal power boilers fuelled by coal, natural gas or oil.

These temperature limitations on the steam in a recovery boiler are not as strictly valid with bark originating from logs, but the fly ash from bark combustion in a bark boiler may also contain chlorine and potassium. As the sulfur content of bark is very low, potassium reacts in the bark boiler with chlorine and forms KCl K and Cl, which in turn may result in superheater corrosion. Calorimetric flow in bark is also much lower than in the black ("waste") liquor flow, due to much lower mass flow.

New power cycles developed to replace the traditional recovery boiler and steam turbine cycle have been studied, and pressurized gasification of "waste" liquor and bark appears to have promising possibilities. However, much more development appears to be needed before these technologies have the necessary reliability and performance.

Anyway, efficient systems have not, to the best of our knowledge, been developed for increasing the temperature and pressure of superheated steam produced at a recovery boiler plant of a pulp mill in such a way that no corrosion occurs or the rate corrosion is at acceptable levels. Thus, according to the present invention, a system is provided for increasing the power yield in energy production at a pulp mill so that corrosion problems can be minimized. A further object of the invention is to provide a compact system, in which heat is recovered efficiently when high temperature and high pressure steam is produced.

For achieving the objects mentioned hereinabove the invention relates to a spent liquor recovery boiler system comprising a boiler having a water/steam circulation system having superheaters and a furnace for recovering energy and chemicals from spent liquor combusted therein, the walls of the boiler being formed of a plurality of water-cooled tubes connected to the water/steam circulation system. It is a characteristic feature of the system according to the invention that the system is provided with at least one cavity having walls formed of water-cooled tubes connected to the water/steam circulation system of the recovery boiler, means for combusting a fuel and at least one outlet for discharging combustion gases to the boiler, the interior of the at least one cavity being provided with heat exchanger means for final superheating of the steam generated in the boiler, said heat exchanger means being connected to the superheaters of the boiler.

According to the system of the invention at least one combustion cavity is provided in connection with a recovery boiler for the final superheating of steam produced in the superheater section of the recovery boiler. The system of the invention allows that the steam is heated in the conventional heat transfer sections (i.e. economizers, boiler bank, and superheaters) of the recovery boiler into such a degree that high temperature corrosion does not substantially take place, i.e. below 520° C., optimally 480-500° C., and after that the steam is final superheated to 500-600° C., optimally to 520-560° C. in the combustion cavity, which serves as a final superheater. The recovery boiler system can be provided with one or more final superheater (cavities). The fuel burned in the final superheater/s is such that it does not cause high temperature corrosion.

The walls of the superheater cavity are designed as water-cooled heat transfer surfaces, which are connected to the main water/steam circulation system of the recovery boiler through connection pipes for the incoming water/steam-water mixture and outgoing water/steam-water mixture. Thus, the heat surfaces form a part of the main water system of the recovery boiler. The main water system and consequently the water system of the superheater cavity can be of natural circulation type or forced circulation or so called once-through, the last-mentioned being typical for the highest steam/water pressures. In natural circulation boilers this means that cooling water is fed via downcomers from a drum down to headers feeding the walls of the cavity or cavities, and water-steam mixture from these walls is collected and fed into the drum. The cavity can have separate walls of its own, but part of the walls of the cavity or part of the walls of the cavities can be common with the "conventional" part of the boiler.

The interior of the cavity is provided with heat exchanger means for heat transfer from the combustion gas produced in the cavity to the steam flowing in the heat exchanger means.

The heat exchanger means serve as a final superheater for the steam from the superheater section of the recovery boiler.

The optimum location for the cavity is the front wall, which is opposite to the "bullnose" wall, but the cavity can be built on sidewalls too, either as one cavity, or as several ones. The location or locations of the cavity or the cavities can be in the vertical direction anywhere, in relation to the conventional part of the boiler, limited only by the cooling water circulation.

The superheater cavity for the final superheating of the recovery boiler steam is heated by burning fuel. A burner or burners for the fuel are located at the top of the cavity, at the bottom of the cavity, or on the walls of the cavity. The cavity can also be located in a horizontal position, when the most preferred location for the burner or the burners is on one end wall of the cavity.

The combustion air system of the superheater cavity is a part of the combustion air system of the recovery boiler. It may also have a separate air system with an air fan of its own, connection ducts between the fan and the burner(s) and any necessary equipment for the combustion air control.

The superheater cavity for the final superheating of the recovery boiler steam is heated by burning fuel in such a manner that noncorrosive conditions in the superheater cavity are guaranteed. The fuel can be a gas produced by gasifying biomass. The corrosion of heat surfaces can be avoided by additional combustion of sulfurous fuel. Also the cleaning of the gas before the combustion in the superheater cavity guarantees noncorrosive conditions at higher temperatures. Instead of the gas produced from biomass other fuels can be used, e.g. natural gas, LPG, liquefied biomass, methanol, etc. The criterion for the fuel is the noncorrosive nature under the cavity conditions. The fuel combustion in the cavity is normally complete with optimized amount of excess air, but stoichiometric or reducing conditions are also possible, if preferable.

The offgases of the superheater cavity are led into the recovery boiler, preferably to the inlet of the main superheater where they are mixed with the main gas stream coming from the boiler furnace. Other locations for the gas connection are possible as well: the whole area from the lower part of the furnace to the inlet of the economizer. The offgas connection through the boiler wall comprises preferably more than one opening.

The flue gases from the superheater cavity may be used to shape a flue gas flow pattern, from the furnace of the recovery boiler over the bull nose to improve gas distribution and heat transfer into the superheaters, or to generate conditions required for emission control, such as the optimum temperature window for selective non-catalytic reduction (SNCR) to reduce $NO_x$ emissions, or for particle size growth to reduce fine particle (size less than 2.5 micrometers) emissions. Another possibility is to use these flue gases for shaping the flow pattern in the furnace to improve mixing, e.g., introducing these gases via vertically located ports, as is described in European patent 668,983 and in WO 02/081971, instead of air or mixed with air. Combustion in the superheater cavity may be performed also under sub-stoichiometric conditions. Reduced gases thus generated can be introduced into flue gases from the furnace to reduce nitrogen oxide emissions in the flue gases coming from the furnace.

By means of the invention the pressure and the operating temperature of the steam recovered from the waste liquor recovery process is increased by means of the superheater cavity, whereby the overall electrical efficiency of the plant is improved, i.e. more power is generated by the heat recovered in the steam. The system according to the present invention is preferably used in connection with the process described in international patent application PCT/FI03/00358.

During the past years waste liquors from pulping were burned in a separate, refractory lined combustion chamber, which was connected to a recovery boiler. Flue gases flowed from the combustion chamber into the furnace of the recovery boiler, which was equipped with oil or gas burners or with grates for bark and coal etc. In these boilers the separate combustion chamber was used to stabilize combustion, not to superheat steam to the final high temperature from the superheaters of the upper part of the furnace of the boiler. An essential feature of the present invention is that the combustion cavity and the recovery boiler have a common water circulation system. U.S. Pat. No. 2,606,103 describes a system, in which the walls of a separate furnace are cooled by air.

SUMMARY OF THE DRAWINGS

The invention will now be described in more detail with reference to the accompanying drawing, in which one embodiment of the invention is illustrated schematically in FIG. 1.

Figure 1:
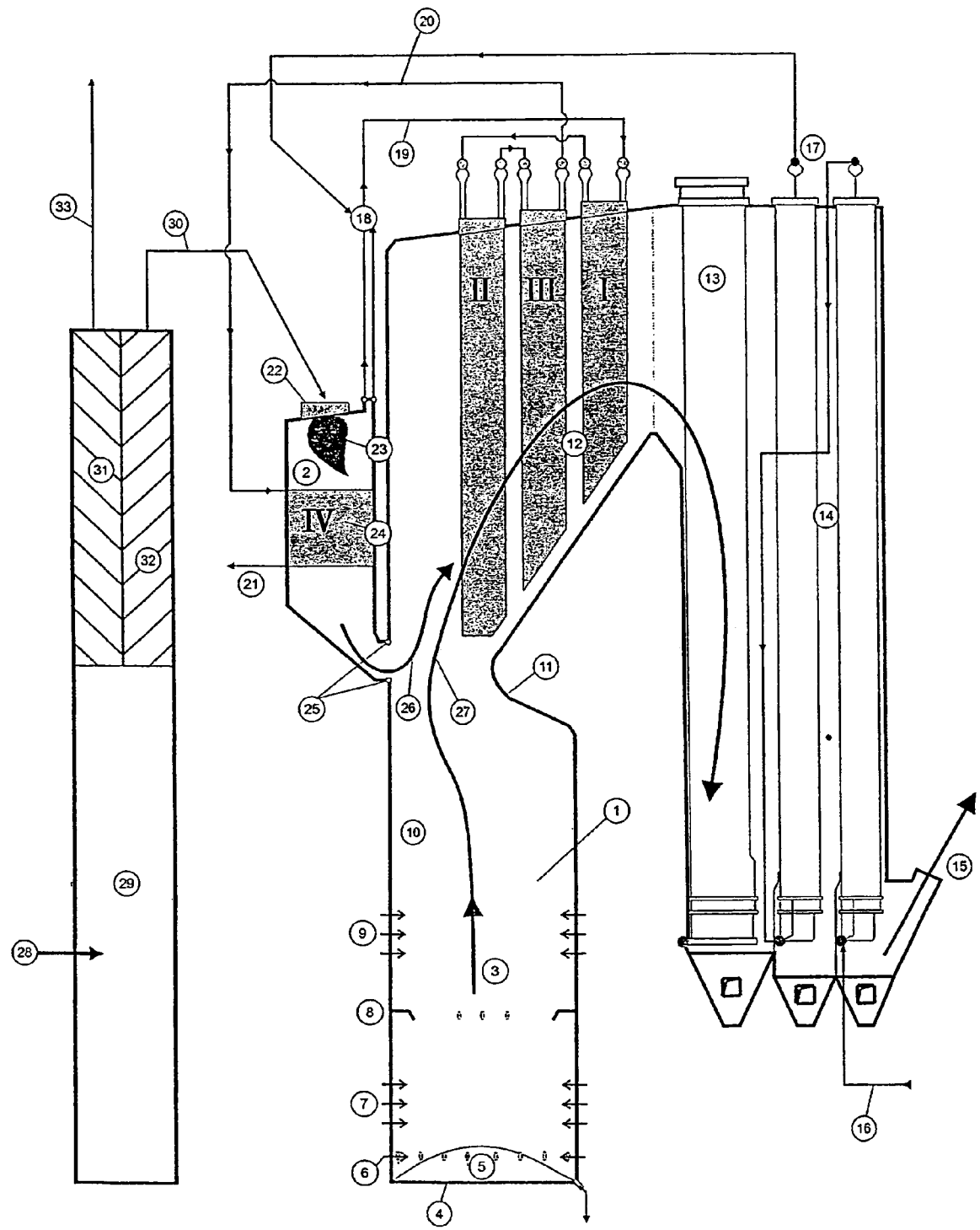

DETAILED DESCRIPTION OF THE INVENTION:

The reference numbers are as follows:
1. Conventional recovery boiler
2. Cavity
3. Furnace of the recovery boiler
4. Floor of the conventional boiler
5. Char bed in the conventional boiler
6. Primary air ports
7. Secondary air ports
8. Liquor spraying equipment
9. Tertiary air ports
10. Water-cooled furnace walls
11. Bullnose
12. Superheaters in the conventional boiler
13. Boiler bank
14. Economizers
15. Flue gases leaving the boiler
16. Feedwater entering the boiler
17. Feedwater entering the drum in the described natural circulation boiler
18. Drum
19. Saturated steam entering the superheaters of the conventional part of the boiler
20. Superheated steam from the conventional part of the boiler entering the superheater(s) in the cavity
21. Live steam leaving the boiler
22. Burner or burners in the cavity
23. Flame or flames in the cavity
24. Superheater or superheaters in the cavity
25. Headers of the cavity to feed cooling water from the drum (18) to the walls of the cavity
26. Flue gas flow from the cavity
27. Flue gas flow from the furnace of the conventional boiler
28. Fuel feed to the gasifier
29. Gasifier
30. Gas to the burner or burners of the cavity
31. Gas cleaning or other type treatment for gases leaving the gasifier for other purposes than for the cavity (2)
32. Gas cleaning or other type treatment for gases leaving the gasifier for the cavity I-III superheaters in the conventional part of the boiler, and IV superheater in the cavity The furnace 3 of a typical recovery boiler, such as a soda recovery boiler, used for the combustion of black liquor, has a structure formed of a water-cooled bottom 4 and water-cooled walls 10 made of a compact membrane structure, so that a water-steam mixture under pressure flows in the tubes. The water-steam generated in this way is superheated downstream of the furnace, typically in a conventional superheater 12 located in the shield of a "nose" above the furnace. In the superheater the heat of the flue gases 27 generated during combustion is recovered. Typically, a boiler bank and an economizer serve as the after-heat surface in the boiler, and after the superheater the flue gases are directed into the boiler bank 13 and economizers 14. The generated high-pressure steam is typically further directed eto a steam turbine in order to produce electricity and process steam needed at the mill.

The lower section of the furnace and the bottom 4 of the soda recovery boiler are made of water-cooled tubes, which constitute a part of the pressurized section of the boiler. Due to the structure of the bottom and the lower section of the furnace, there is natural circulation of water in the bottom tubes, i.e., the circulation is effected by a difference in density. The boiler water is thus led at a high pressure and at a temperature of, for example, about 300° C. to a distributing header (not shown) below the bottom of the furnace, from which the water is distributed into the bottom and sidewall tubes. In the lower section of the furnace, the water flows first nearly horizontally or obliquely upwards in the bottom tubes towards the walls, and then further upwards through the wall tubes to the upper section of the boiler.

The invention is based on a recovery boiler, where steam pressure is such that excessive corrosion does not take place, i.e. the saturation temperature in water-steam emulsion plus the temperature difference due to incoming heat flux from the tube surface into water is less than 400-500° C., which is the tube surface temperature.

The steam temperature can be increased over the typical figures by integrating into the conventional recovery boiler 1 a special combustion and heat transfer chamber or cavity 2. The steam is superheated in the conventional superheater part 12 to such a degree that high temperature corrosion does not take place, e.g. 480-520° C., optimally 480-500° C. and the rest of the superheating up to 500-600° C., optimally to 520-560° C., takes place in a superheater or in superheaters 24 in a special combustion and heat transfer cavity 2 integrated into the recovery boiler, where the fuel to be burned in a burner or burners 22 with flame or flames 23 is so clean that it does not cause high temperature corrosion. Flue gases 26 from the cavity 2 are introduced into the flue gas stream 27 of the recovery boiler. Preferably the flue gases from the cavity are directed through several openings in the wall of the recovery boiler so that the combustion eases from the at least one cavity are discharged immediately upstream of the superheaters of the boiler.

The cavity 2 is a part of a conventional recovery boiler, so that the walls of the cavity are water-cooled as in the conventional part of the furnace, in the boiler bank and in other hot areas, and this cooling is integrated into the drum 18 or into the drums of the conventional boiler with natural circulation. In once-through type boilers this integration means that the walls of the cavity are cooled by the water or steam flows of the once-through system. Same type of integration with circulation water is also valid for forced circulation type recovery boilers, if this arrangement is used. The main advantage is the introduction of heat from the cooling of the cavity into the same pressure water or steam flow or flows as in the main flow of the "conventional" part of the recovery boiler. Air for the combustion can be taken from the "conventional" part of the recovery boiler or the cavity may be equipped with its own fans or compressors.

According to a preferred embodiment a combustion gas 30 for the cavity is produced in a gasifier 29 by gasifying biomass material 28. Then a part of the gases is used in the cavity as clean fuel 30 in the burner 22 to superheat the steam in the superheater 24 (IV) and also for re-heating purposes. Part of the gases 33 is used for other purposes at the pulp mill. If this type of fuel is not available, other fuels like natural gas, LPG, oil, methanol, liquefied biomass etc can be used. The criterion for the fuel is the noncorrosive nature under the cavity conditions. This noncorrosive nature can be created in the gas from gasification 29 by cleaning the gas in treatment 31 or 32.

The invention is not intended to be limited to the embodiment illustrated and described above but it can be modified and varied within the scope and spirit of the invention as defined by the following claims. The use of the system of the invention is not limited to the firing of a certain spent liquor, but it can be applied in connection with several spent liquors, such as spent liquors from a kraft pulping process and soda pulping process.

The invention claimed is:

1. A spent liquor recovery boiler system comprising:
   a boiler further comprising a water or steam circulation system having superheaters and a furnace for recovering energy and chemicals from spent liquor combusted in the furnace;
   walls of the boiler further comprising a plurality of water cooled tubes in fluid communication with the water or steam circulation system;
   at least one cavity separate from the boiler, said cavity having cavity walls formed of water cooled tubes in fluid communication with the water cooled tubes in at least one of the walls of the boiler and the superheaters of the water or steam circulation system of the boiler, wherein at least a portion of the water cooled tubes of the cavity walls is formed of the water cooled tubes of a front wall of the boiler;
   a fuel combustor arranged in the at least one cavity;
   at least one outlet of the cavity for discharging combustion gases from the cavity to the boiler at an elevation below the superheaters of the boiler, wherein said outlet of the cavity is opposite a bullnose section of a rear wall of the boiler and the outlet discharges combustion gases from the at least one cavity immediately upstream of the superheaters of the boiler, and
   an interior of the at least one cavity having a cavity heat exchanger for superheating steam generated by superheaters in the boiler, wherein the cavity heat exchanger is below the fuel combustor and above the at least one outlet of the cavity and the cavity heat exchanger receives steam from at least one of the superheaters in the boiler.

2. A liquor recovery boiler system comprising:
   a boiler further comprising at least one wall defining a furnace, at least one liquor injector arranged to inject liquor into the furnace, and at least one superheater arranged in a flue gas passage for combustion gases generated in the furnace,
   a plurality of water cooled tubes arranged in the at least one wall defining the furnace;
   at least one cavity separate from the furnace and having walls formed of water cooled tubes, wherein fluid flowing through at least one of the water cooled tubes of the at least one wall defining the furnace flows through at least one of the water cooled tubes of the cavity, and wherein at least a portion of the at least one of the water cooled tubes of the cavity are formed of at least one of the water cooled tubes of the walls of the boiler such that water or steam flows from the at least one of the water cooled tubes of the walls of the boiler to the at least one of the water cooled tubes of the cavity and to the at least one superheater in the flue gas passage in the furnace;

a fuel combustor arranged in the at least one cavity;

at least one outlet for discharging combustion gases from the cavity to the boiler;

an interior of the at least one cavity being provided with a heat exchanger which receives superheated steam from the at least one superheater of the boiler, wherein the heat exchanger (i) is below the fuel combustor of the at least one cavity and above the at least one outlet, and (ii) receives steam from the at least one superheater in the flue gas passage of the boiler, and a gasifier for gasifying a biomass material and said gasifier produces combustion gas provided to the fuel combustor of the cavity.

3. The liquor recovery boiler system of claim 2 wherein the liquor injector discharges spent liquor into the furnace.

4. The liquor recovery boiler system of claim 2 wherein the at least one superheater of the boiler is a plurality of superheaters arranged in a flue gas stream of the boiler.

5. The liquor recovery boiler system according to claim 2 wherein the at least one cavity is located on a front wall of the boiler.

6. The liquor recovery boiler system according to claim 2 wherein the at least one outlet for combustion gases is connected to the boiler and provides a conduit for combustion gases from the at least one cavity to be discharged immediately upstream of the superheaters of the boiler.

7. The liquor recovery boiler system according to claim 2 wherein the outlet of the cavity is in a front wall of the boiler and said outlet is opposite to a bullnose section of a rear wall of the boiler.

8. The liquor recovery boiler system according to claim 2 wherein the cavity is adjacent an outside surface of the at least one wall of the furnace.

9. A method for superheating steam in a recovery boiler having at least one wall defining a furnace and a separate combustion cavity, said method comprising:

a. injecting spent liquor in the furnace to generate hot combustion flue gases in the furnace;

b. cooling the at least one wall of the furnace by flowing cooling fluid through the wall;

c. generating hot combustion gases in the cavity, wherein the combustion gases in the cavity are generated in a gasifier gasifying a biomass material and the combustion gases are generated in an upper portion of the cavity;

d. cooling a cavity wall of the cavity by flowing the cooling fluid from the at least one wall of the furnace through the cavity wall, wherein the cavity wall is at least partially formed of the at least one wall of the furnace;

e. passing cooling fluid from the wall of the cavity to a superheater arranged in a flue gas passage of the boiler;

f. passing cooling fluid from the superheater in the gas passage of the boiler directly to a superheater in the cavity, wherein the superheater in the cavity is below the upper portion of the cavity and above a combustion gas outlet between the cavity and the at least one wall of the furnace;

g. passing the combustion gases in the cavity downward from the gasifer, over the superheater in the cavity and to the outlet to mix the combustion gases with the flue gases in the furnace.

10. The method of claim 9 wherein the hot combustion gases in the cavity are discharged into the boiler upstream of the superheater in the boiler.

11. The method of claim 9 wherein the cooling fluid flows vertically upward through the at least one wall of the furnace and then to the cavity.

12. The method of claim 9 wherein the cooling fluid in the superheater of the boiler is heated to a temperature no greater than 520° C.

13. The method of claim 9 further comprising passing fluid from the superheater in the gas passage of the boiler to the superheater in the cavity, and wherein the fluid in the superheater in the boiler is heated to a temperature no greater than 520° C. and the fluid in the superheater in the cavity is heated to a temperature in a range of 500° C. to 600° C.

14. The method of claim 9 further comprising passing fluid from the superheater in the boiler to superheater in the cavity, and wherein the fluid in the superheater in the boiler is heated to a temperature in a range of 480° C. to 520° C. and the fluid in the superheater in the cavity is heated to a temperature in a range of 500° C. to 600° C.

15. The method of claim 9 wherein the biomass material is selected from a group consisting of oil, methanol and liquefied biomass.

16. A method for superheating steam in a recovery boiler having a furnace and a separate combustion cavity, wherein said furnace and separate combustion cavity include walls formed of common water cooled tubes in fluid communication, said method comprising:

a. injecting spent liquor in the furnace to generate hot combustion flue gases in the boiler;

b. directing the flue gases through a flue gas passage of the furnace;

c. generating hot combustion gases in an upper region of the cavity;

d. flowing cooling fluid through the common water cooled tubes from the wall of the furnace to the wall of the cavity;

e. injecting the hot combustion gases from the cavity into the furnace at an opening between the cavity and a front wall of the furnace and opposite to a bullnose section of a back wall of the furnace;

f. the injection of the hot combustion gases from the cavity mixes with the flue gas in the flue gas passage;

g. flowing the cooling fluid from the water cooled tubes of the cavity to a superheater in a portion of the flue gas passage of the furnace downstream of the mixing of the hot combustion gases from the cavity and the flue gases in the gas passage, and g. directing the cooling fluid from the superheater in the flue gas passage to a superheater in the cavity between the upper region of the cavity and the opening between the cavity and the furnace, wherein the steam is directed through a conduit external to the flue gas passage.

* * * * *